United States Patent
Larson et al.

(10) Patent No.: US 10,309,247 B2
(45) Date of Patent: Jun. 4, 2019

(54) HYBRID RAM AIR TURBINE

(71) Applicant: HAMILTON SUNDSTRAND CORPORATION, Charlotte, NC (US)

(72) Inventors: Michael Larson, Rockford, IL (US); David Chapman, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 516 days.

(21) Appl. No.: 14/549,651

(22) Filed: Nov. 21, 2014

(65) Prior Publication Data
US 2016/0146035 A1 May 26, 2016

(51) Int. Cl.
| | |
|---|---|
| *F02C 7/32* | (2006.01) |
| *F02C 7/36* | (2006.01) |
| *B64D 41/00* | (2006.01) |
| *F01D 15/08* | (2006.01) |
| *F03D 9/32* | (2016.01) |
| *F03D 9/00* | (2016.01) |

(52) U.S. Cl.
CPC ............ *F01D 15/08* (2013.01); *B64D 41/007* (2013.01); *F02C 7/32* (2013.01); *F02C 7/36* (2013.01); *F03D 9/00* (2013.01); *F03D 9/32* (2016.05); *F05D 2220/34* (2013.01)

(58) Field of Classification Search
CPC .......... F03D 9/00; F03D 9/32; F05D 2220/34; B64D 41/007; F01D 15/08; F02C 7/32; F02C 7/36
See application file for complete search history.

(56) References Cited

U.S. PATENT DOCUMENTS

| | | | | |
|---|---|---|---|---|
| 4,672,998 | A * | 6/1987 | Kozak, III | ............ F16L 27/093 137/614 |
| 5,564,903 | A * | 10/1996 | Eccles | .................. F01D 25/164 244/58 |
| 6,331,099 | B1* | 12/2001 | Eccles | .................. B64D 41/007 416/142 |
| 6,676,379 | B2* | 1/2004 | Eccles | .................. B64D 41/007 244/58 |
| 7,708,527 | B2* | 5/2010 | Eccles | .................. B64D 41/007 416/170 R |
| 8,641,379 | B2* | 2/2014 | Russ | .................... B64D 41/007 416/142 |
| 2007/0160460 | A1 | 7/2007 | Eccles | |
| 2011/0236218 | A1 | 9/2011 | Russ | |
| 2012/0183402 | A1* | 7/2012 | Bortoli | ................. B64D 41/007 416/170 R |

OTHER PUBLICATIONS

National Institute of Industrial Property, French Office Action dated Jul. 20, 2016 in French Application No. 1561188.
National Institute of Industrial Property, French Office Action dated Feb. 27, 2018 in French Application No. 1561188.
National Institute of Industrial Property, French Search Report dated Mar. 30, 2018 in French Application No. 1561188.

* cited by examiner

*Primary Examiner* — Ninh H. Nguyen
*Assistant Examiner* — Brian P Wolcott
(74) *Attorney, Agent, or Firm* — Snell & Wilmer, L.L.P.

(57) ABSTRACT

A ram air turbine is provided that utilizes a hybrid design. The ram air turbine includes a hydraulic power conversion device directly coupled to a turbine shaft and an electric power conversion device coupled to a drive shaft. A gearbox is used to couple the turbine shaft to the drive shaft.

13 Claims, 4 Drawing Sheets

HYBRID RAM AIR TURBINE

FIELD

The present disclosure relates to components of ram air turbines, and more particularly, to hybrid ram air turbines.

BACKGROUND

Ram air turbines are generally used in aircraft to provide supplemental and/or emergency power to the aircraft by utilizing air flow to rotate a turbine. Ram air turbines may provide electrical power, hydraulic power, or both. Electrical ram air turbines produce electrical power by transferring the rotation of the turbine to a power conversion device, such as a generator. Hydraulic ram air turbines produce hydraulic power in a similar manner, using a hydraulic pump. However, electrical power conversion devices and hydraulic power conversion devices may operate optimally at different rotational velocities.

SUMMARY

A ram air turbine may comprise a blade removably coupled to a turbine shaft, a gearbox removably coupled to the turbine shaft and a drive shaft, an electrical power conversion device coupled to the drive shaft, and a hydraulic power conversion device coupled to the turbine shaft. The hydraulic power conversion device may a hydraulic pump. The electrical power conversion device may comprise a generator. The hydraulic power conversion device may further comprise an inlet hose and a discharge hose coupled a swivel post on the hydraulic pump. The gearbox may be configured to increase a turbine rotational rate to a higher speed drive shaft rotational rate or reduce a turbine rotational rate to a lower speed drive shaft rotational rate. Further, the gearbox may comprise a gear coupled to the turbine shaft and a bevel gear coupled to the drive shaft.

A ram air turbine may comprise a blade coupled to a turbine shaft, a hydraulic pump coupled to the turbine shaft and an electrical generator coupled to a drive shaft. The hydraulic power conversion device may further comprise an inlet hose and a discharge hose coupled a swivel post on the hydraulic pump. The gearbox may be configured to increase a turbine rotational rate to a higher speed drive shaft rotational rate or reduce a turbine rotational rate to a lower speed drive shaft rotational rate. Further, the gearbox may comprise a gear coupled to the turbine shaft and a bevel gear coupled to the drive shaft.

BRIEF DESCRIPTION OF THE DRAWINGS

The subject matter of the present disclosure is particularly pointed out and distinctly claimed in the concluding section of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
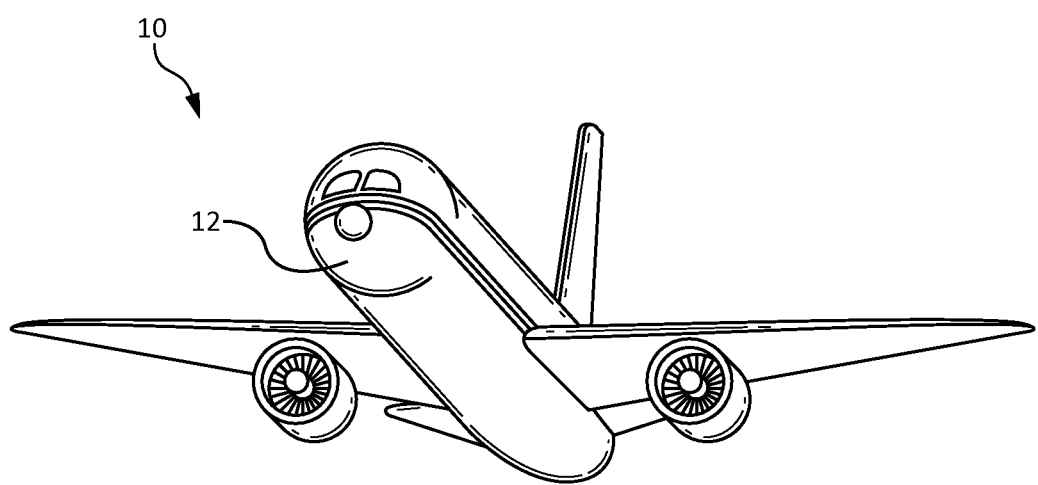
FIG. 1 illustrates a perspective view of an aircraft, in accordance with various embodiments.

In various embodiments and with reference to FIG. 1, an aircraft 10 may comprise a nose 12. A ram air turbine 100 may be located within nose 12 or other locations of aircraft 10, and when desired, ram air turbine 100 may be lowered out of nose 12 and into the path of airflow.

Figure 2A:
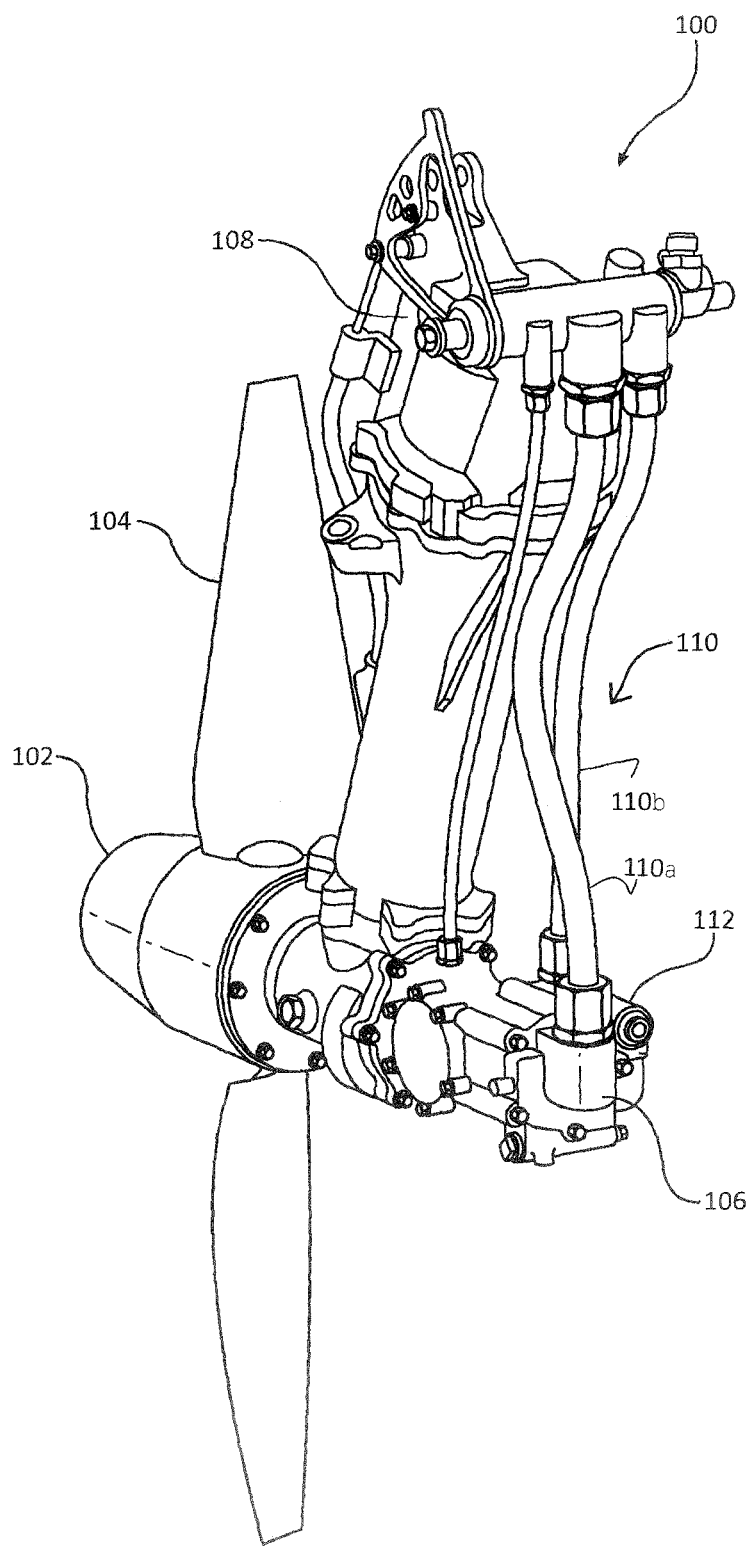
FIGS. 2A and 2B illustrate side views of a ram air turbine of an aircraft, in accordance with various embodiments.
Figure 2B:
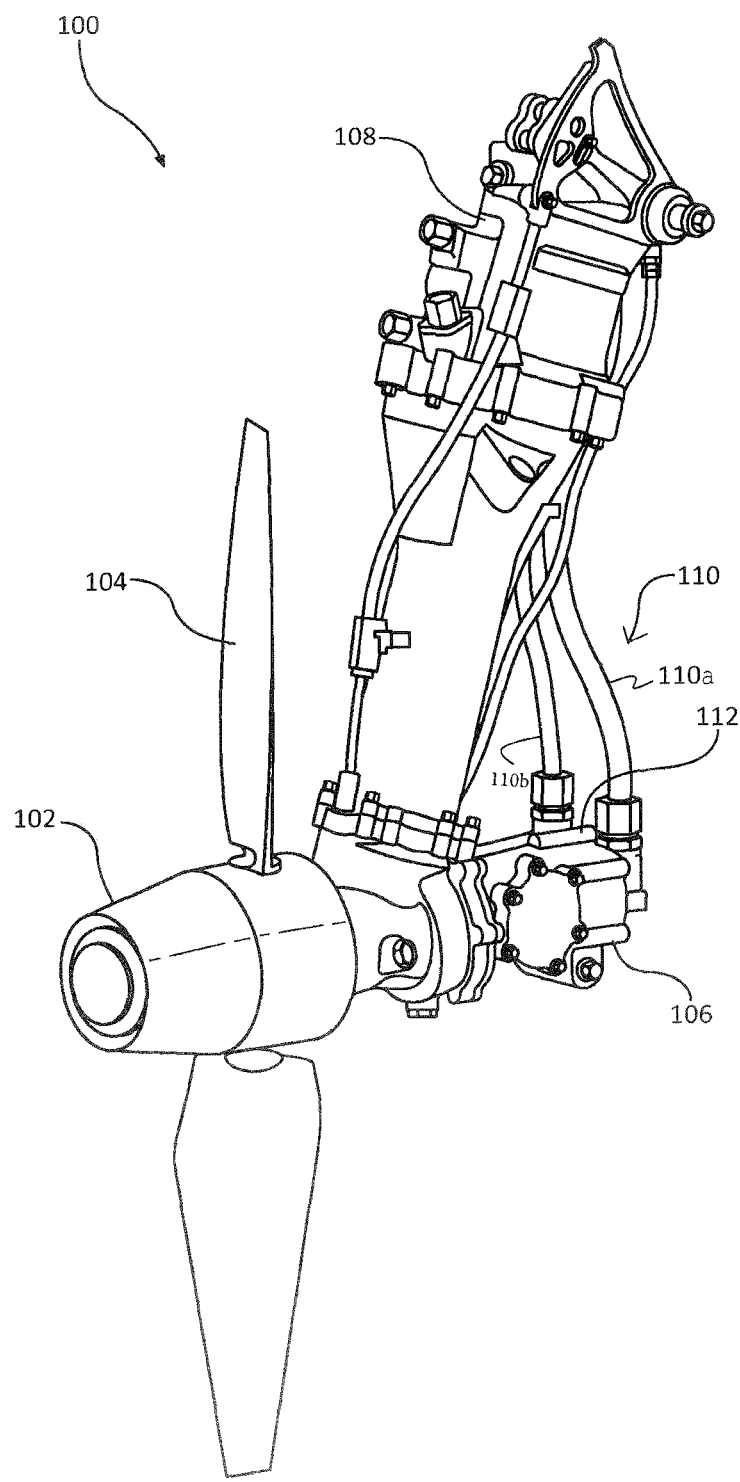

With reference to FIGS. 2A and 2B, ram air turbine 100 may comprise, for example a turbine 102 having one or more blades 104. In various embodiments, after ram air turbine 100 is lowered into the path of airflow, the airflow causes blades 104 of turbine 102 to rotate.

In various embodiments, ram air turbine 100 further comprises a hydraulic power conversion device 106. Hydraulic power conversion device 106 may, for example, be capable of converting rotation from turbine 102 into hydraulic pressure. Hydraulic power conversion device 106 may comprise, for example, a hydraulic pump. In various embodiments, hydraulic power conversion device 106 is coupled to one or more hoses capable of transmitting unpressurized hydraulic fluid to the conversion device and pressurized hydraulic fluid from the conversion device to hydraulic components of aircraft 10.

For example, hydraulic power conversion device 106 may comprise one or more hydraulic hoses 110. In various embodiments, an inlet hose 110a and discharge hose 110b are coupled to hydraulic power conversion device 106. Inlet hose 110a and discharge hose 110b may, for example, be coupled to a swivel post 112 of hydraulic power conversion device 106. Swivel post 112 may, for example, permit inlet house 110a and discharge hose 110b to rotate relative to hydraulic power conversion device 106, which may reduce stress and/or strain on the hoses. However, any manner of coupling hydraulic hoses to hydraulic power conversion device 106 is within the scope of the present disclosure.

Ram air turbine 100 may further comprise, for example, an electrical power conversion device 108. In various embodiments, electrical power conversion device 108 is capable of converting rotation from turbine 102 into electrical energy. For example, electrical power conversion device 108 may comprise a generator.

Figure 3:
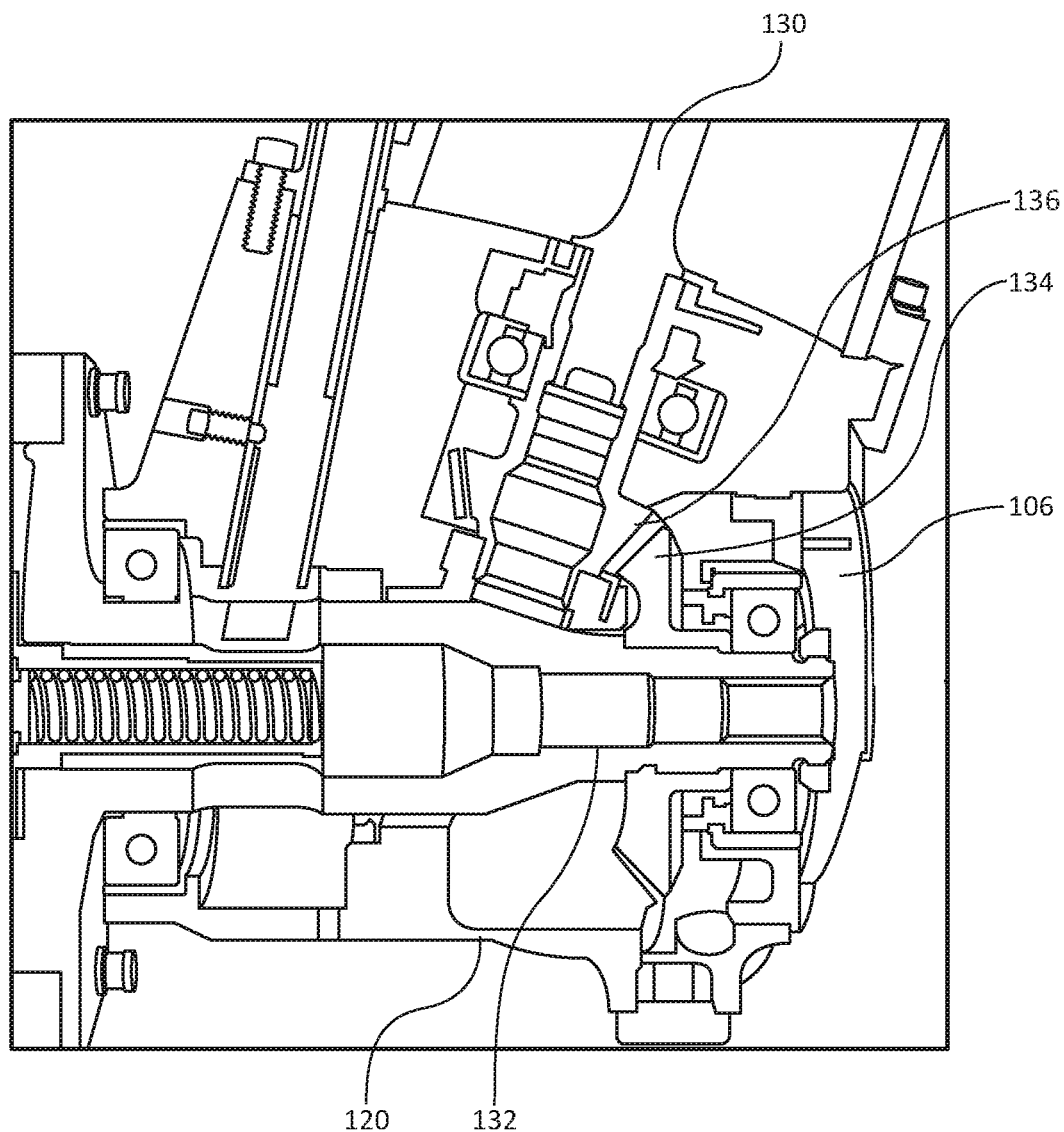
FIG. 3 illustrates a cross sectional view of a gear box, in accordance with various embodiments.

With reference to FIG. 3, ram air turbine 100 may further comprise a gearbox 120. In various embodiments, gearbox 120 is configured to receive and transmit rotation from a turbine shaft 132 to a drive shaft 130. For example, gearbox 120 may be configured to receive turbine shaft 132 rotating at a turbine rotational velocity and convert the rotation to a higher speed drive shaft rotational velocity. Further, gearbox 120 may be configured to convert a turbine rotational velocity to a lower speed drive shaft rotational velocity.

In various embodiments, gearbox 120 may comprise a gear 134 removably coupled to turbine shaft 132. Gearbox 120 may further comprise a bevel gear 136 removably coupled to drive shaft 130. Bevel gear 136 may, for example, engage with gear 134 to transmit rotation of turbine shaft 132 to drive shaft 130.

Turbine shaft 132 may be directly coupled to hydraulic power conversion device 106. For example, turbine shaft 132 may pass from turbine 102, through gearbox 120, and removably couple to hydraulic power conversion device 106. In such embodiments, the rotation of turbine 102 is directly translated to hydraulic power conversion device 106 (e.g., a hydraulic pump). Stated another way, hydraulic pump may rotate at a 1:1 ratio to the rotation of turbine 102.

In various embodiments, drive shaft 130 is coupled to electrical power conversion device 108. For example, drive shaft 130 may couple to turbine shaft 132 within gearbox 120, and transmit rotation of turbine 102 to electrical power conversion device 108 (e.g., an electrical generator). As previously noted, it may be desired that the velocity of rotation of drive shaft 130 may be higher or lower than the velocity of rotation of turbine shaft 132, therefore causing electrical power conversion device 108 to rotate at a velocity higher or lower than turbine shaft 132. In that regard, gearbox 120 allows turbine shaft 132 to drive hydraulic power conversion device 106 at a first velocity while simultaneously driving drive shaft 130 at a second velocity. Thus, both hydraulic power conversion device 106 and drive shaft 130 receive the desired rotational velocity input from the same rotational source.

For example, in various embodiments, gearbox 120 may be configured to rotate electrical power conversion device 108 between a ratio of about 5:1 to 5:4, or about 4:1 to 3:2, or further about 2:1 to the rotation of turbine shaft 132. For example, electrical power conversion device may be configured to produce approximately 400 Hz of alternating current power, which may be accomplished by providing a gearbox 120 capable of rotating electrical power conversion device 108 at a ratio of 2:1 to the rotation of turbine shaft 132.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ram air turbine, comprising:
    a blade removably coupled to a turbine shaft;
    a gearbox removably coupled to both the turbine shaft and a drive shaft;
    an electrical power conversion device coupled to the drive shaft via the gearbox;
    a hydraulic power conversion device directly in contact with the turbine shaft, wherein the hydraulic power conversion device comprises a hydraulic pump; and
    an inlet hose and a discharge hose coupled to the hydraulic pump, wherein the inlet hose and the discharge hose are also coupled to a swivel post.

2. The ram air turbine of claim 1, wherein the electrical power conversion device comprises a generator.

3. The ram air turbine of claim 1, wherein the gearbox is configured to increase a turbine rotational velocity to a higher speed drive shaft rotational velocity.

4. The ram air turbine of claim 1, wherein the gearbox is configured to reduce a turbine rotational velocity to a lower speed drive shaft rotational velocity.

5. The ram air turbine of claim 1, wherein the gearbox comprises a gear coupled to the turbine shaft and a bevel gear coupled to the drive shaft, wherein the bevel gear engages with the gear to transmit rotation of the turbine shaft to the drive shaft, wherein the gear surrounds the turbine shaft and the bevel gear surrounds the drive shaft.

6. The ram air turbine of claim 1, wherein the rotation of the turbine shaft is directly translated to the hydraulic power conversion device.

7. The ram air turbine of claim 1, wherein the turbine shaft rotates at a 1:1 ratio with the hydraulic power conversion device.

8. The ram air turbine of claim 1, wherein the swivel post is mounted on the hydraulic power conversion device.

9. A ram air turbine, comprising:
    a blade removably coupled to a turbine shaft;
    a hydraulic pump in direct contact with the turbine shaft;
    an electrical generator coupled to a drive shaft via a gearbox; and an inlet hose and a discharge hose, wherein the inlet hose and the discharge hose are coupled to a swivel post.

10. The ram air turbine of claim 9, wherein the gearbox is removably coupled to the turbine shaft and the drive shaft.

11. The ram air turbine of claim 10, wherein the gearbox comprises a gear coupled to the turbine shaft and a bevel gear coupled to the drive shaft, wherein the bevel gear engages with the gear to transmit rotation of the turbine shaft to the drive shaft, wherein the gear surrounds the turbine shaft and the bevel gear surrounds the drive shaft.

12. The ram air turbine of claim 5, wherein the gearbox is configured to increase a turbine rotational velocity to a higher speed drive shaft rotational velocity.

13. The ram air turbine of claim 5, wherein the gearbox is configured to reduce a turbine rotational velocity to a lower speed drive shaft rotational velocity.

\* \* \* \* \*